(12) United States Patent
Koga et al.

(10) Patent No.: US 11,081,727 B2
(45) Date of Patent: Aug. 3, 2021

(54) SOLID ELECTROLYTE AND ELECTRICITY STORAGE DEVICE USING THE SAME

(71) Applicant: Panasonic Intellectual Property Management Co., Ltd., Osaka (JP)

(72) Inventors: Eiichi Koga, Osaka (JP); Yoshiko Higashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 23 days.

(21) Appl. No.: 16/534,125

(22) Filed: Aug. 7, 2019

(65) Prior Publication Data
US 2020/0168945 A1 May 28, 2020

(30) Foreign Application Priority Data
Nov. 28, 2018 (JP) .............................. JP2018-222888

(51) Int. Cl.
| H01M 10/0562 | (2010.01) |
| H01M 10/052 | (2010.01) |
| H01G 9/032 | (2006.01) |
| C01G 25/00 | (2006.01) |

(52) U.S. Cl.
CPC ...... *H01M 10/0562* (2013.01); *C01G 25/006* (2013.01); *H01G 9/032* (2013.01); *H01M 10/052* (2013.01); *C01P 2004/38* (2013.01); *C01P 2006/10* (2013.01); *C01P 2006/40* (2013.01); *H01M 2300/0077* (2013.01)

(58) Field of Classification Search
CPC .......... H01M 10/052; H01M 10/0562; H01M 2300/0068; H01M 2300/0077; H01M 4/62
See application file for complete search history.

(56) References Cited

U.S. PATENT DOCUMENTS

| 2009/0202912 A1* | 8/2009 | Baba .................. H01M 4/0414 429/231.95 |
| 2010/0075219 A1* | 3/2010 | Iwaya .................. H01M 10/38 429/158 |
| 2014/0154586 A1* | 6/2014 | Hayashi ............ H01M 10/4235 429/322 |
| 2018/0166739 A1 | 6/2018 | Yamamoto et al. |

FOREIGN PATENT DOCUMENTS

JP 62722296 1/2018

OTHER PUBLICATIONS

Zhaoshuai Zhang et al., "Interface-Engineered Li7La3Zr2O12-Based Garnet Solid Electrolytes with Suppressed Li-Dendrite Formation and Enhanced Electrochemical Performance", ChemSusChem, 10.1002/cssc.201801756, Sep. 7, 2018.
Alfred Junio Samson et al., "Towards Mixed Ionic and Electronic Conducting Li-Stuffed Garnets", Journal of the Electrochemical Society, 165 (10) A2303-A2311 (2018), Jul. 25, 2018.

* cited by examiner

*Primary Examiner* — Carlos Barcena
(74) *Attorney, Agent, or Firm* — McDermott Will & Emery LLP

(57) ABSTRACT

Provided is a solid electrolyte containing a crystal phase having a chemical composition $Li_{7(1+x)}\alpha_3\beta_{2+a}O_{12+3.5x+b}$, where $\alpha$ includes Pr, $\beta$ includes Zr, $-0.05 \le x \le 0.35$, $-0.5 \le a \le 0.5$, and $-0.5 \le b \le 0.5$.

15 Claims, 1 Drawing Sheet

SOLID ELECTROLYTE AND ELECTRICITY STORAGE DEVICE USING THE SAME

BACKGROUND

1. Technical Field

The present disclosure relates to a solid electrolyte and an electricity storage device using the same.

2. Description of the Related Art

Patent Literature 1 discloses an oxide solid electrolyte having a chemical composition of $Li_7La_3Zr_2O_{12}$. The oxide solid electrolyte having the chemical composition of $Li_7La_3Zr_2O_{12}$ disclosed in Patent Literature 1 has a garnet-type crystal structure. Patent Literature 2 also discloses an oxide solid electrolyte having a chemical composition of $Li_7La_3Zr_2O_{12}$. The oxide solid electrolyte having the chemical composition of $Li_7La_3Zr_2O_{12}$ disclosed in Patent Literature 2 includes main elements composed of Li, La, Zr, and O and a substitution element including Bi. The oxide solid electrolyte having the chemical composition of $Li_7La_3Zr_2O_{12}$ disclosed in Patent Literature 2 has a garnet-type crystal structure or a garnet-like crystal structure. As disclosed in Patent Literature 1 and Patent Literature 2, the oxide solid electrolyte is provided by sintering a compact.

The prior $Li_7La_3Zr_2O_{12}$ oxide solid electrolyte (hereinafter, referred to as "conventional solid electrolyte") has a problem that the stability in an air (hereinafter, referred to as "atmospheric stability") is insufficient. To form the conventional solid electrolyte, the compact is required to be sintered at high temperature of not less than 1,200 degrees Celsius. If the compact is sintered integrally and concurrently with internal electrodes in fabrication of an electricity storage device including the prior solid electrode, the material of the internal electrodes is required to have high melting point of not less than 1,200 degrees Celsius. An example of a metal having such a high melting point is a noble metal. However, use of the noble metal leads to a problem that fabrication cost of the electricity storage device is raised.

CITATION LIST

Patent Literature

Patent Literature 1: United States Patent Application Publication No. 2018/166739 A1
Patent Literature 2: Japanese Patent Publication No. 6272229

SUMMARY

An object of the present disclosure is to provide a solid electrolyte (i) having high electrical conductivity which is equal to or higher than that of the conventional solid electrolyte, (ii) having high atmospheric stability, and (iii) formed by sintering a compact at low temperature.

The solid electrolyte according to the present disclosure contains:

a crystal phase having a chemical composition $Li_{7(1+x)}\alpha_3\beta_{2+a}O_{12+3.5x+b}$ where $\alpha$ includes Pr;

$\beta$ includes Zr;

$-0.05 \le x \le 0.35$;

$-0.5 \le a \le 0.5$; and $-0.5 \le b \le 0.5$.

The present disclosure provides a solid electrolyte (i) having high electrical conductivity which is equal to or higher than that of the conventional solid electrolyte, (ii) having high atmospheric stability, and (iii) formed by sintering a compact at low temperature. Furthermore, the present disclosure provides an electricity storage device such as a battery or a multi-layer capacitor in which the solid electrolyte has been used.

DETAILED DESCRIPTION OF THE EMBODIMENT

Figure 1:
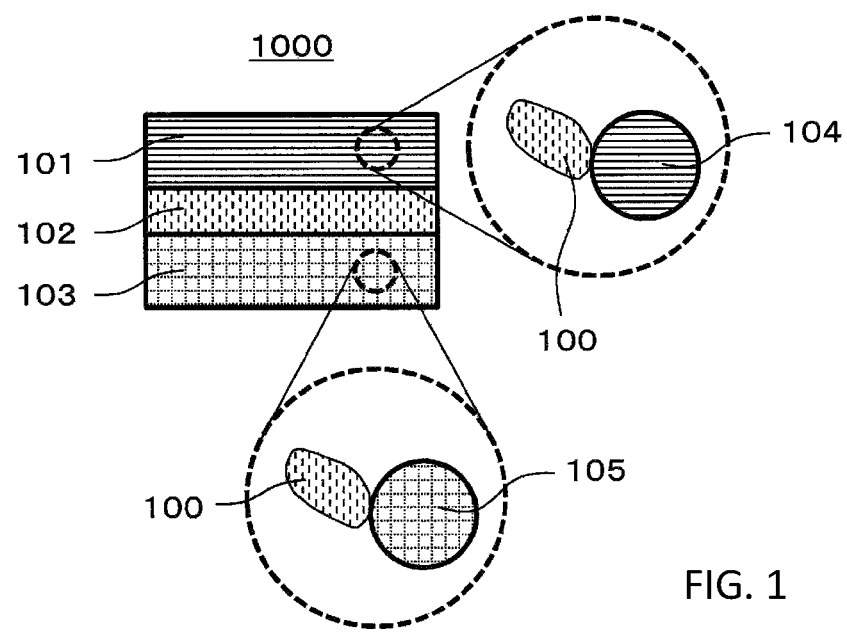
FIG. 1 shows a cross-sectional view of a battery according to the second embodiment.

Hereinafter, the embodiments of the present disclosure will be described with reference to the drawings.

First Embodiment

The solid electrolyte according to the first embodiment contains a crystal phase having a chemical composition $Li_{7(1+x)}\alpha_3\beta_{2+a}O_{12+3.5x+b}$. $\alpha$ includes Pr. $\beta$ includes Zr. The following three mathematical formulas (I)-(III) are satisfied.

$$-0.05 \le x \le 0.35 \quad (I)$$

$$-0.5 \le a \le 0.5 \quad (II)$$

$$-0.5 \le b \le 0.5 \quad (III)$$

The solid electrolyte according to the first embodiment has high electrical conductivity and high atmospheric stability which are equal to or higher than those of a conventional solid electrolyte. The solid electrolyte according to the first embodiment is formed by sintering a compact at low temperature. The compact will be described later in detail. Hereinafter, in the present specification, to distinguish from a typical compact, the compact which will be used to provide the solid electrolyte according to the first embodiment may be referred to as "a compact according to the first embodiment". In other words, the compact according to the first embodiment is sintered to provide a solid electrolyte according to the first embodiment.

As above described, since the solid electrolyte according to the first embodiment is formed by sintering the compact according to the first embodiment at low temperature, the compact according to the first embodiment is allowed to be sintered together with a metal having a low melting point of less than 1,200 degrees Celsius, desirably, not more than 1,100 degrees Celsius. An example of the metal having a low melting point of less than 1,200 degrees Celsius (desirably, not more than 1,100 degrees Celsius) is an Ag—Pd metal. The Ag—Pd metal will be described later in more detail.

Since the solid electrolyte according to the first embodiment is an oxide solid electrolyte, unlike a sulfide solid electrolyte, the solid electrolyte according to the first embodiment does not contain sulfur. Therefore, the solid electrolyte according to the first embodiment has high stability that no hydrogen sulfide is generated upon exposure to an air. For the high stability, the solid electrolyte according to the first embodiment can be used suitably for an electricity storage device which is fabricated and used in an air.

In the chemical composition $Li_{7(1+x)}\alpha_3\beta_{2+a}O_{12+3.5x+b}$, the composition ratio of Li, α, and β elements does not have to be a stoichiometric composition ratio.

To further raise the electrical conductivity, to further improve the atmospheric stability, and to further decrease the temperature at which the compact according to the first embodiment is sintered, a molar ratio of Pr to the entire of a may be not less than 0.8 and a molar ratio of Zr to the entire of β may be not less than 0.8.

To further raise the electrical conductivity, to further improve the atmospheric stability, and to further decrease the temperature at which the compact according to the first embodiment is sintered, the element of α may be Pr and the element of β may be Zr.

α may include an element other than Pr. An example of the element other than Pr is a rare-earth element such as La, Nd, or Sm.

β may include an element other than Zr. An example of the element other than Zr is Al, Nb, Ta, Hf, or Bi.

The value of x is not less than −0.05 and not more than 0.35. The value of x may be not less than 0 and not more than 0.3, or more than 0 and not more than 0.3. If the value of x is not less than 0, the density and the electrical conductivity of the solid electrolyte according to the first embodiment are improved. Furthermore, the sintering temperature is decreased. In the present specification, the term "sintering temperature" means a temperature at which the compact according to the first embodiment is sintered. If the value of x is more than 0, since a Li content contained in the solid electrolyte is increased, the sintering temperature is further decreased. This allows a cubic-system garnet-type crystal structure to be generated at lower temperature at higher density to further raise the electrical conductivity. If the value of x is not more than 0.3, the electrical conductivity is further improved. In a case where Li in large amount is contained, a problem of fusion of the solid electrolyte occurs; however, if the value of x is not more than 0.3, the problem of the fusion is prevented from occurring.

Both of the values of a and b may be equal to 0. If the both of the values of a and b are equal to 0, since the solid electrolyte according to the first embodiment has a crystal structure in which neither a defect of β such as Zr nor a defect of oxygen is included, the electrical conductivity and the atmospheric stability thereof are improved and the sintering temperature is allowed to be decreased.

The crystal phase included in the solid electrolyte according to the first embodiment may have a cubic-system garnet-type crystal structure. If the crystal phase has a cubic-system garnet-type crystal structure, since the solid electrolyte according to the first embodiment has a dense structure, the electrical conductivity is further improved.

The solid electrolyte according to the first embodiment may include a crystal phase having a crystal structure other than the cubic-system garnet-type crystal structure. For example, the solid electrolyte according to the first embodiment may include at least one kind of a crystal phase selected from the group consisting of a tetragonal-system garnet-type crystal phase and a Pr—Zr pyrochlore phase (e.g., $Pr_2Zr_2O_7$).

The solid electrolyte according to the first embodiment may form a solid solution of the cubic-system garnet-type crystal structure. For example, the solid electrolyte according to the first embodiment may be composed of a single phase of the cubic-system garnet-type crystal structure. The sentence "the solid electrolyte is composed of a single phase of the cubic-system garnet-type crystal structure" means that the solid electrolyte is determined to be composed of a single phase of the cubic-system garnet-type crystal structure on the basis of a result of an X-ray diffraction. Therefore, the solid electrolyte may include another crystal phase which cannot be detected even at the detection minimum sensitivity level of the X-ray diffraction.

If the solid electrolyte according to the first embodiment is composed of the single phase of the cubic-system garnet-type crystal structure, the solid electrolyte has a density of not less than 4.0 g/cm³ and high electrical conductivity (e.g., electrical conductivity of not less than $10^{-4}$ S/cm at room temperature). In the present specification, the term "room temperature" means, as one example, 25 degrees Celsius. Furthermore, if the solid electrolyte according to the first embodiment is composed of the single phase of the cubic-system garnet-type crystal structure, the characteristic thereof does not change even for a long time, for example, 500 hours. As a result, the solid electrolyte has high mechanical strength.

The solid electrolyte according to the first embodiment may have a density of not less than 4.0 g/cm³. If the solid electrolyte has a density of not less than 4.0 g/cm³, the electrical conductivity thereof is further improved. As one example, the solid electrolyte has an electrical conductivity of not less than $10^{-4}$ S/cm at room temperature.

Next, a method for fabricating the solid electrolyte according to the first embodiment will be described.

The solid electrolyte according to the first embodiment can be fabricated by the following method.

Starting materials such as metal oxides are prepared, and then, weight of each of the starting materials is measured so as to have a targeted chemical composition. For example, if the targeted chemical composition is $Li_{7(1+x)}Pr_3Zr_{2+a}O_{12+3.5x+b}$, a $Li_2CO_3$ powder, a $Pr_6O_{11}$ powder, and a $ZrO_2$ powder are prepared as the starting materials, and then, weight of these starting materials are measured so as to have a Li:Pr:Zr:O molar ration of (7(1+x)):3:(2+a):(12+3.5x+b).

Subsequently, the starting materials are mixed, and then, ground to provide a powder mixture. The provided powder mixture is calcined. Then, the calcined powder is ground. Subsequently, an organic binder is added to the ground powder, and then, the organic binder is dispersed to provide a mixture. Then, using a filter, a mixture of particles each having a predetermined size is provided. The mixture is pressured to provide a compact having a predetermined size and thickness. In this way, the compact according to the first embodiment is provided. The compact is sintered to provide a sintered body. In this way, the solid electrolyte according to the first embodiment is provided. In other words, the solid electrolyte according to the first embodiment is a sintered body.

The temperature at which the compact according to the first embodiment is sintered may be less than 1,200 degrees Celsius, or not less than 1,050 degrees Celsius and not more than 1,150 degrees Celsius. As described above, the term "sintering temperature" means temperature at which the compact according to the first embodiment is sintered. Since the sintering temperature is less than 1,200 degrees Celsius, the compact according to the first embodiment can be sintered together with a low-melting metal such as a Cu metal or the Ag—Pd alloy. The sintering temperature may be not less than 1,050 degrees Celsius and not more than 1,130 degrees Celsius, or not less than 1,050 degrees Celsius and not more than 1,100 degrees Celsius. The sintering time is, for example, not less than 2 hours and not more than 10 hours.

The term "sintering at the low temperature" used in the present specification means sintering at temperature of less than 1,200 degrees Celsius, desirably, not less than 1,050 and not more than 1,150 degrees Celsius.

In place of the above-described fabrication method, the solid electrolyte according to the first embodiment may be fabricated by the following method.

First, an organic binder is mixed with the starting materials to provide slurry. Green sheets are formed using the provided slurry. A plurality of the green sheets are stacked to provide a stacking structure. The stacking structure is pressured to compress the plurality of the green sheets. Then, the compressed stacking structure is sintered. In this way, an appropriate fabricating method can be chosen, depending on the shape of the targeted solid electrolyte.

In the above-described fabrication method, powders of metal oxides are mixed, calcined, and sintered to provide the solid electrolyte. However, a Pr pyrochlore compound (e.g., $Pr_2Zr_2O_7$) which is generated by the calcination may be synthesized in advance as a precursor of the solid electrolyte, and the precursor may be used as the starting material to provide the solid electrolyte according to the first embodiment.

Hereinafter, the solid electrolyte according to the first embodiment will be described in more detail. On a premise that the solid electrolyte according to the first embodiment has a crystal phase having a garnet-type crystal structure including Pr, the solid electrolyte according to the first embodiment may be described. Hereinafter, the garnet-type crystal structure including Pr may be referred to as a Pr garnet-type crystal structure.

Since Li contained in the Li-based material is easily evaporated, after the Li-based material is sintered at high sintering temperature, a crystal phase of Li defects (e.g., a pyrochlore phase (namely, $La_2Zr_2O_7$)) tends to be segregated at a grain boundary region. Even in trace amount, the segregated crystal phase of the Li defects is decomposed due to the reaction with at least one selected from the group consisting of water moisture and carbon dioxide contained in an air. As a result, a problem that the crystal phase is swelled occurs. Due to the swelling, cracks are generated between crystal particles each having a garnet-type crystal structure, and finally, the sintered body is deteriorated. On the other hand, the compact according to the first embodiment containing Pr is sintered at temperature which is lower than 1,200 degrees Celsius (namely, at temperature which is lower than the temperature at which a compact containing La is sintered) to provide the solid electrolyte having a dense garnet-type crystal structure.

As just described, since the compact according to the first embodiment contains Pr, the compact according to the first embodiment is sintered at temperature of less than 1,200 degrees Celsius to provide the dense solid electrolyte.

As a result, a composition contained in the compact is prevented from being evaporated during the sintering of the compact according to the first embodiment to improve atmospheric stability. Actually, the present inventors found that the Pr—Zr pyrochlore phase (e.g., $Pr_2Zr_2O_7$) has the high atmospheric stability.

If the solid electrolyte according to the first embodiment has crystal phases each having a garnet-type crystal structure including Pr, the solid electrolyte according to the first embodiment has the high stability regardless of presence or absence of the Pr—Zr pyrochlore phase in trace amount between the crystal phases.

In the first embodiment, since both a $Pr^{3+}$ ion and a $Pr^{4+}$ ion are introduced in a crystal lattice of the solid electrolyte having a Pr garnet-type crystal structure, a defect or an interstitial ion is easily formed at low energy. As a result, the cubic-system garnet-type crystal structure is generated at the low temperature.

Both the $Pr^{3+}$ ion and the $Pr^{4+}$ ion contained in the garnet-type crystal structure form an ion diffusion path. This would be a reason why the solid electrolyte having the Pr garnet-type crystal structure has high ion conductivity.

For the above-described mechanism, the oxide electrolyte having the Pr garnet-type crystal structure provided by sintering the compact according to the first embodiment at the low temperature has not only the high electrical conductivity (e.g., the electrical conductivity of not less than $10^{-4}$ S/cm at room temperature) but also the high atmospheric stability.

Particularly, if the solid electrolyte according to the first embodiment is composed of the single phase of the cubic-system garnet-type crystal structure and has a density of not less than 4.0 g/cm$^3$, the solid electrolyte according to the first embodiment has the high electrical conductivity (e.g., the electrical conductivity of not less than $10^{-4}$ S/cm at room temperature) and an excellent performance that no characteristic change occurs for a long time. The crystal phase of the pyrochlore phase generated by calcination is turned into the tetragonal system of the garnet-type crystal structure due to further sintering, and then, turned into the cubic system. Together with the turn of the crystal phase, the compact according to the first embodiment is sintered more densely to provide the solid electrolyte having the density of not less than 4.0 g/cm$^3$.

Furthermore, in the first embodiment, the sintering and the change of the crystal phase are likely to proceed at lower temperature in a case where the Li content is excessive (i.e., if x>0) than in a case where x=0. Therefore, the cubic-system garnet-type crystal structure is formed stably, and the electrical conductivity is raised. On the other hand, if the Li content is too excessive (i.e., if x>0.35), an unnecessary phase is generated to lower the electrical conductivity. If the Li content is large, a problem of the generation of the fusion of the solid electrolyte due to excessive sintering may occur. The fusion is prevented from being generated more certainly if the value of x is not more than 0.3, compared to a case where the value of x is more than 0.3.

Since the compact in a small Li amount is slightly inferior in terms of a sintering property, the compact in the small Li amount is required to be sintered at high temperature. It is desirable that the value of x is, for example, not less than 0 from a viewpoint of a decrease in the temperature at which the compact according to the first embodiment is sintered.

As demonstrated in the examples which will be described later, the value of x is not less than −0.05 and not more than 0.35. To further decrease the temperature at which the compact according to the first embodiment is sintered, the value of x may be not less than 0 and not more than 0.35. From viewpoints of the further improvement of the electrical conductivity and the prevention of the generation of the fusion due to the excessive sintering, the value of x may be not less than 0 and not more than 0.3. From viewpoints of the further decrease in the temperature at which the compact according to the first embodiment is sintered, the further improvement of the electrical conductivity, and the prevention of the generation of the fusion due to the excessive sintering, the value of x may be more than 0 and not more than 0.3.

Since Li is easily evaporated, the Li defect is easily formed on a free surface of the solid electrolyte containing Li. The term "free surface" means a surface which has not processed after sintering. A crystal phase generated due to the excessive sintering is also easily formed on the free surface of the sintered body.

For example, if the solid electrolyte is disk-shaped, the front surface of the solid electrolyte is composed of the crystal phase having the cubic system garnet-like crystal structure and the pyrochlore phase having the Li defect, and the back surface of the solid electrolyte is composed of the cubic-system garnet-type single phase. To analyze the crystal phase of the surface of the solid electrolyte, X-ray diffraction is effective. With the X-ray diffraction, a part of the crystal phase having a thickness of approximately 20 micrometers from the surface of the solid electrolyte can be analyzed. Using an analysis result of the crystal phase of the surface as an index, a synthesis process is designed.

As demonstrated in the inventive examples 4, 5, 7, 8, 12, 13, 16 and 17, the solid electrolyte according to the first embodiment may be composed of the crystal phase having the cubic-system garnet-type crystal structure. In the first embodiment, not only the surface of the solid electrolyte but also the inside of the solid electrolyte may be formed of the single phase.

If the solid electrolyte according to the first embodiment has the high-density surface and is composed of the single phase of the cubic-system garnet-type crystal structure, not only the electrical conductivity but also mechanical strength is improved. This is because internal stress which occurs due to the swelling generated by water moisture or carbon dioxide contained in an air is absent in the solid electrolyte.

If the free surface includes the Li defect, the surface of the solid electrolyte may be removed by a barrel polishing method to provide a solid electrolyte composed of a desired crystal phase (e.g., a crystal phase having the cubic-system garnet-type crystal structure). If the free surface includes the crystal phase which has occurred due to the excessive sintering, the surface layer may be removed similarly to the above.

In an industrial mounting process, if a white sintered body is slightly colored, the white sintered body may be determined as a rejected item. Even if the white sintered body is not determined as the rejected item, the slightly colored white sintered body is not desired from a viewpoint of contrast in image recognition.

For this reason, in the industrial mounting process, an additive may be added to the solid electrolyte to color the solid electrolyte intentionally and highly. However, the additive may cause a problem that the characteristic of the solid electrolyte is deteriorated. The solid electrolyte according to the first embodiment exhibits a black color originated by Pr. Therefore, the additive is not required for the solid electrolyte according to the first embodiment. As a result, in the first embodiment, the problem of the deterioration of the property of the solid electrolyte by the addition of the additive is prevented.

Second Embodiment

The solid electrolyte described in the first embodiment is used for an electricity storage device according to the second embodiment. In the second embodiment, the matters described in the first embodiment are omitted appropriately.

As above described, the electricity storage device according to the second embodiment comprises a first electrode, a second electrode, and the solid electrolyte according to the first embodiment. The electricity storage device according to the second embodiment has an excellent performance and high stability.

The electricity storage device according to the second embodiment is, for example, a battery or a multi-layer capacitor.

As above described, the electricity storage device according to the second embodiment comprises the solid electrolyte according to the first embodiment. As described in the first embodiment, the compact according to the first embodiment is sintered at temperature of less than 1,200 degrees Celsius. Therefore, in the electricity storage device according to the second embodiment, the first electrode and the second electrode may include a metal having a low melting point.

For example, the first electrode and the second electrode may include a metal having a melting point of not more than 1,100 degrees Celsius. Therefore, since the range of the choice of the electrode material is enlarged, the first electrode and the second electrode are allowed to be formed of a low-cost metal.

As one example, the first electrode and the second electrode may contain an Ag—Pd alloy. In the Ag—Pd alloy, it is desirable that a molar ratio of Ag to Pd is more than 6/4 and not more than 7/3, since the Ag—Pd alloy having an Ag/Pd molar ratio of 6/4 has a melting point of approximately 1,200 degrees Celsius and the Ag—Pd alloy having an Ag/Pd molar ratio of 7/3 has a melting point of approximately 1,050 degrees Celsius. Since the Ag—Pd alloy has low resistance, the Ag—Pd alloy is used for the first electrode and the second electrode to provide the electricity storage device excellent in the performance at low cost.

The compact according to the first embodiment may be sintered integrally together with the first and second electrodes each formed of the Ag—Pd alloy to provide the electricity storage device comprising the first electrode, the second electrode, and the solid electrolyte. The electricity storage device has sufficient electrical conductivity and excellent atmospheric stability.

If the electricity storage device according to the second embodiment is a battery, the battery comprises the first electrode, the second electrode, and an electrolyte layer provided between the first electrode and the second electrodes. At least one selected from the group consisting of the first electrode, the second electrode, and the electrolyte layer includes the solid electrolyte according to the first embodiment. The electrolyte layer may include the solid electrolyte according to the first embodiment. In this way, a battery having the excellent performance and the excellent stability is provided.

FIG. 1 shows a cross-sectional view of a battery 1000 according to the second embodiment. As shown in FIG. 1, the battery 1000 according to the second embodiment comprises a cathode 101, an anode 103, and an electrolyte layer 102. The cathode 101 and the anode 103 correspond to the first electrode and the second electrode of the electricity storage device according to the second embodiment, respectively. The cathode 101 contains cathode active material particles 104 and a solid electrolyte 100 (i.e., the solid electrolyte according to the first embodiment). The electrolyte layer 102 is provided between the cathode 101 and the anode 103. The electrolyte layer 102 is in contact with both the cathode 101 and the anode 103. The electrolyte layer 102 may contain the solid electrolyte according to the first embodiment. The anode 103 contains anode active material particles 105 and the solid electrolyte 100 (i.e., the solid electrolyte according to the first embodiment). For example, the battery 1000 is a solid-state lithium secondary battery. The battery 1000 according to the second embodiment has an excellent performance and an excellent stability, since the battery 1000 according to the second embodiment includes the solid electrolyte according to the first embodiment.

In the second embodiment, all of the cathode 101, the anode 103 and the electrolyte layer 102 may contain the solid electrolyte according to the first embodiment. The electrolyte layer 102 may contain the solid electrolyte according to the first embodiment. Since the electrolyte layer 102 contains the largest amount of an electrolyte material in the cathode 101, the anode 103 and the electrolyte layer 102, the solid electrolyte according to the first embodiment is used for the electrolyte layer 102 to improve the property and stability. As long as the solid electrolyte according to the first embodiment is contained in the at least one selected from the group consisting of the cathode 101, the anode 103 and the electrolyte layer 102, the battery 1000 has the excellent performance and the excellent stability. Each of the cathode 101, the anode 103 and the electrolyte layer 102 may contain a solid electrolyte other than the solid electrolyte according to the first embodiment.

The cathode 101 contains a cathode active material, namely, a material capable of occluding and releasing metal ions. An example of the metal ions is a lithium ion. For example, the cathode 101 contains the cathode active material (e.g., the cathode active material particles 104). The cathode 101 may contain the solid electrolyte 100.

An example of the cathode active material is a transition metal oxide containing lithium, a transition metal oxide which does not contain lithium, a transition metal fluoride, a polyanion material, a fluorinated polyanion material, a transition metal sulfide, a transition metal oxyfluoride, a transition metal oxysulfide, or a transition metal oxynitride. If the lithium-containing transition metal oxide can be used as the cathode active material to lower the production cost of the battery 1000 and to raise a mean electric discharge voltage of the battery 1000.

At least one selected from the group consisting of Li(Ni-CoAl)O$_2$ and LiCoO$_2$ may be contained in the cathode 101 as the cathode active material. These transition metal oxides can be used to raise a high energy density of the battery 1000.

Each of the cathode active material particles 104 may have a median size of not less than 0.1 micrometer and not more than 100 micrometers. If each of the cathode active material particles 104 has an appropriate size, the cathode active material particles 104 and particles of the solid electrolyte 100 are dispersed well in the cathode 101. As a result, the battery 1000 has an excellent discharge property. Furthermore, since lithium ions are dispersed quickly in the inside of the cathode active material particles 104, the battery 1000 has a high output. To disperse the cathode active material particles 104 and the particles of the solid electrolyte 100 well, each of the cathode active material particles 104 may have a larger median size than each of the particles of the solid electrolyte 100.

In the cathode 101, a ratio of a volume vc1 of the cathode active material particles 104 to the sum of the ratio of the volume vc1 of the cathode active material particles 104 and a volume vc2 of the solid electrolyte 100 is, for example, not less than 30% and not more than 95%. In other words, the volume ratio represented by the mathematical formula (vc1/(vc1+vc2)) may be not less than 0.3 and not more than 0.95. The ratio of the volume vc2 of the solid electrolyte 100 to the sum of the ratio of the volume vc1 of the cathode active material particles 104 and the volume vc2 of the solid electrolyte 100 is, for example, not less than 5% and not more than 70%. In other words, the volume ratio represented by the mathematical formula (vc2/(vc1+vc2)) may be not less than 0.05 and not more than 0.7. The amount of the cathode active material particles 104 and the amount of the solid electrolyte 100 can be adjusted appropriately to ensure the energy density of the battery 1000 sufficiently and to operate the battery 1000 at high output.

The cathode 101 may have a thickness of not less than 10 micrometers and not more than 500 micrometers. The thickness of the cathode 101 can be adjusted appropriately to ensure the energy density of the battery 1000 sufficiently and to operate the battery 1000 at high output.

As above described, the electrolyte layer 102 may contain the solid electrolyte according to the first embodiment. The electrolyte layer 102 may contain not only the solid electrolyte according to the first embodiment but also a solid electrolyte other than the solid electrolyte according to the first embodiment.

Hereinafter, the solid electrolyte according to the first embodiment is referred to as a first solid electrolyte. The solid electrolyte other than the solid electrolyte according to the first embodiment is referred to as a second solid electrolyte.

If the electrolyte layer 102 contains not only the first solid electrolyte but also the second solid electrolyte, the first solid electrolyte and the second solid electrolyte are dispersed uniformly in the electrolyte layer. The second solid electrolyte may have a composition different from that of the first solid electrolyte. The second solid electrolyte may have a structure different from that of the first solid electrolyte.

The electrolyte layer 102 may have a thickness of not less than 1 micrometer and not more than 500 micrometers. The thickness of the electrolyte layer 102 can be adjusted appropriately to prevent the cathode 101 and the anode 103 surely from shorting and to operate the battery 1000 at high output.

The anode 103 contains an anode active material, namely, a material capable of occluding and releasing metal ions. An example of the metal ions is a lithium ion. For example, the anode 103 contains the anode active material (e.g., the anode active material particles 105). The anode 103 may contain the solid electrolyte 100.

An example of the anode active material is a metal material, a carbon material, an oxide, a nitride, a tin compound, or a silicon compound. The metal material may be an elemental metal or an alloy. An example of the metal material is a lithium metal or a lithium alloy. An example of the carbon material is natural graphite, coke, graphitized carbon, carbon fibers, spherical carbon, artificial graphite, or amorphous carbon. From the viewpoint of capacity density, at least one selected from the group consisting of silicon (namely, Si), tin (namely, Sn), a silicon compound, and a tin compound can be suitably used as the anode active material.

Each of the anode active material particles 105 may have a median size of not less than 0.1 micrometers and not more than 100 micrometers. If each of the anode active material particles 105 has an appropriate size, the anode active material particles 105 and the particles of the solid electrolyte 100 are dispersed well in the anode 103. As a result, the battery 1000 has an excellent discharge property. Furthermore, since the lithium ions are dispersed quickly in the inside of the anode active material particles 105, the battery 1000 has a high output. To disperse the anode active material particles 105 and the particles of the solid electrolyte 100 well, each of the anode active material particles 105 may have a larger median size than each of the particles of the solid electrolyte 100.

In the anode 103, a ratio of a volume va1 of the anode active material particles 105 to the sum of the ratio of the volume va1 of the anode active material particles 105 and a volume va2 of the solid electrolyte 100 is, for example, not less than 30% and not more than 95%. In other words, the volume ratio represented by the mathematical formula (va1/(va1+va2)) may be not less than 0.3 and not more than 0.95. The ratio of the volume va2 of the solid electrolyte 100 to the sum of the ratio of the volume va1 of the anode active material particles 105 and a volume va2 of the solid electrolyte 100 is, for example, not less than 5% and not more than 70%. In other words, the volume ratio represented by the mathematical formula (va2/(va1+va2)) may be not less than 0.05 and not more than 0.7. The amount of the anode active material particles 105 and the amount of the solid electrolyte 100 can be adjusted appropriately to ensure the energy density of the battery 1000 sufficiently and to operate the battery 1000 at high output.

The anode 103 may have a thickness of not less than 10 micrometers and not more than 500 micrometers. The thickness of the anode 103 can be adjusted appropriately to ensure the energy density of the battery 1000 sufficiently and to operate the battery 1000 at high output.

The second solid electrolyte may be a sulfide solid electrolyte. The sulfide solid electrolyte may be contained in the cathode 101, the anode 103, and the electrolyte layer 102. An example of the sulfide solid electrolyte materials is $Li_2S-P_2S_5$, $Li_2S-SiS_2$, $Li_2S-B_2S_3$, $Li_2S-GeS_2$, $Li_{3.25}Ge_{0.25}P_{0.75}S_4$, or $Li_{10}GeP_2S_{12}$. LiX (X is F, Cl, Br, or I), $Li_2O$, $MO_q$, or $Li_pMO_q$ (M is P, Si, Ge, B, Al, Ga, In, Fe, or Zn, p is a natural number, and q is a natural number) may be added to the sulfide solid electrolyte material. The sulfide solid electrolyte material improves ion conductivity of the solid electrolyte 100.

The second solid electrolyte may be an oxide solid electrolyte. The oxide solid electrolyte may be contained in the cathode 101, the anode 103, and the electrolyte layer 102. The oxide solid electrolyte material improves ion conductivity of the solid electrolyte 100.

An example of the oxide solid electrolyte is:

(i) a NASICON solid electrolyte such as $LiTi_2(PO_4)_3$ or an element substitution product thereof;

(ii) a $(LaLi)TiO_3$-type perovskite solid electrolyte;

(iii) a LISICON solid electrolyte such as $Li_{14}ZnGe_4O_{16}$, $Li_4SiO_4$, $LiGeO_4$, or an element substitution product thereof;

(iv) a garnet solid electrolyte such as $Li_7La_3Zr_2O_{12}$ or an element substitution product thereof; or (v) $Li_3N$ or an H-substitute thereof; or (vi) $Li_3PO_4$ or an N-substitute thereof.

The second solid electrolyte may be a halide solid electrolyte. The halide solid electrolyte may be contained in the cathode 101, the anode 103, and the electrolyte layer 102. The halide solid electrolyte material improves ion conductivity of the solid electrolyte 100.

An example of the halide solid electrolyte is $Li_3InBr_6$, $Li_3InCl_6$, $Li_2FeCl_4$, $Li_2CrCl_4$, or $Li_3OCl$.

The second solid electrolyte may be a complex hydride solid electrolyte. The complex hydride solid electrolyte may be contained in the cathode 101, the anode 103, and the electrolyte layer 102. The complex hydride solid electrolyte material improves ion conductivity of the solid electrolyte 100.

An example of the complex hydride solid electrolyte is $LiBH_4-LiI$ or $LiBH_4-P_2S_5$.

The second solid electrolyte may be an organic polymer solid electrolyte. The organic polymer solid electrolyte may be contained in the cathode 101, the anode 103, and the electrolyte layer 102. The organic polymer solid electrolyte material improves ion conductivity of the solid electrolyte 100.

An example of the organic polymer solid electrolyte is a compound of a polymer compound and a lithium salt. The polymer compound may have an ethylene oxide structure. Since the polymer solid electrolyte having the ethylene oxide structure is capable of containing a large amount of lithium salts, the ion conductivity is further raised. An example of the lithium salt is $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. One kind of the lithium salt selected from the above may be used alone. Alternatively, a mixture of two or more kinds of the lithium salts selected from the above may be used.

The at least one selected from the group consisting of the cathode 101, the anode 103 and the electrolyte layer 102 may contain a non-aqueous electrolyte, a gel electrolyte, or an ion liquid to facilitate migration of lithium ions and to improve the output property of the battery 1000.

The non-aqueous electrolyte contains a non-aqueous solvent and a lithium salt dissolved in the non-aqueous solvent.

An example of the non-aqueous solvent is a cyclic carbonate ester solvent, a chain carbonate ester solvent, a cyclic ether solvent, a chain ether solvent, a cyclic ester solvent, a chain ester solvent, or a fluorine solvent.

An example of the cyclic carbonate solvent is ethylene carbonate, propylene carbonate, or butylene carbonate.

An example of the chain carbonate ester solvent is dimethyl carbonate, ethyl methyl carbonate, or diethyl carbonate.

An example of the cyclic ether solvent is tetrahydrofuran, 1,4-dioxane, or 1,3-dioxolane.

An example of the chain ether solvent is 1,2-dimethoxyethane or 1,2-diethoxyethane.

An example of the cyclic ester solvent is γ-butyrolactone.

An example of the chain ester solvent is methyl acetate.

An example of the fluorine solvent is fluoroethylene carbonate, methyl fluoropropionate, fluorobenzene, fluoroethylmethyl carbonate, or fluorodimethylene carbonate.

As the non-aqueous solvent, one kind of the non-aqueous solvent selected from the group consisting of these solvents may be used alone. Alternatively, as a non-aqueous solvent, a mixture of two or more kinds of the non-aqueous solvents selected from the group consisting of these solvents may be used.

An example of the lithium salt is $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$.

One kind of the lithium salt selected from these lithium salts may be used alone. Alternatively, a mixture of two or more kinds of the lithium salts selected from these lithium salts may be used.

The lithium salt may have a concentration of not less than 0.5 mol/liter and not more than 2 mol/liter.

An example of the gel electrolyte is a polymer material impregnated with the non-aqueous electrolyte liquid. An example of the polymer material is polyethylene oxide, polyacrylonitrile, polyvinylidene fluoride, or polymethyl methacrylate. Another example of the polymer material is a polymer having an ethylene oxide bond.

An example of the cation included in the ion liquid is:

(I) a cation of an aliphatic chain quaternary ammonium salt such as tetraalkylammonium, (ii) a cation of an aliphatic chain quaternary phosphonium salt such as tetraalkylphosphonium, (iii) an aliphatic cyclic ammonium such as pyrrolidinium, morpholinium, imidazolinium, tetrahydropyrimidinium, piperazinium, or piperidinium, or (iv) a nitrogen-containing heterocyclic aromatic cation such as pyridinium or imidazolium.

An example of the anion included in the ionic liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, $C(SO_2CF_3)_3^-$. The ionic liquid may contain a lithium salt.

The at least one selected from the group consisting of the cathode 101, the anode 103 and the electrolyte layer 102 may contain a binder to improve an adhesion of the particles.

An example of the binder is polyvinylidene fluoride, polytetrafluoroethylene, polyethylene, polypropylene, aramid resin, polyamide, polyimide, polyamide imide, polyacrylonitrile, polyacrylic acid, polyacrylic acid methyl ester, polyacrylic acid ethyl ester, poly acrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber, or carboxymethylcellulose.

Copolymers may also be used as the binder. An example of such a binder is a copolymer of two or more kinds of materials selected from the group consisting of tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene.

A mixture of two or more materials selected from these materials may be used as the binder.

At least one selected from the group consisting of the cathode 101 and the anode 103 may contain a conductive assistant agent to improve electron conductivity.

An example of the conductive assistant agent is:

(I) graphite such as natural graphite or artificial graphite;
(ii) carbon black such as acetylene black or ketjen black;
(iii) conductive fibers, such as carbon fibers or metal fibers;
(iv) carbon fluoride;
(v) metal powder such as aluminum powder;
(vi) conductive whiskers such as zinc oxide whiskers or potassium titanate whiskers;
(vii) a conductive metal oxide such as titanium oxide; or
(viii) a conductive polymer compound such as polyaniline, polypyrrole, or polythiophene.

The shape of the conductive assistant agent is not limited. An example of the shape of the conductive assistant agent is a needle, a scale, a sphere, or an ellipse. The conductive assistant agent may be a particle.

Each of the cathode active material particles 104 and the anode active material particles 105 may be coated with a coating material to lower interface resistance. Only a part of a surface of each of the cathode active material particles 104 may be coated with the coating material. Alternatively, the entire of the surface of each of the cathode active material particles 104 may be coated with the coating material. Similarly, only a part of a surface of each of the anode active material particles 105 may be coated with a coating material. Alternatively, the entire of the surface of each of the anode active material particles 105 may be coated with the coating material.

An example of the coating material is a solid electrolyte such as the sulfide solid electrolyte, the oxide solid electrolyte, the halide solid electrolyte, the organic polymer solid electrolyte, or the complex hydride solid electrolyte. The coating material may be an oxide solid electrolyte. The oxide solid electrolyte has excellent high electric potential stability. The oxide solid electrolyte can be used as the coating material to improve charge and discharge efficiency of the battery 1000.

An example of the oxide solid electrolyte which can be used as the coating material is:

(i) a Li—Nb—O compound such as $LiNbO_3$;
(ii) a Li—B—O compound such as $LiBO_2$ or $Li_3BO_3$;
(iii) a Li—Al—O compound such as $LiAlO_2$;
(iv) a Li—Si—O compound such as $Li_4SiO_4$;
(v) $Li_2SO_4$;
(vi) a Li—Ti—O compound such as $Li_4Ti_5O_{12}$;
(vii) a Li—Zr—O compound such as $Li_2ZrO_3$;
(viii) a Li—Mo—O compound such as $Li_2MoO_3$;
(ix) a Li—V—O compound such as $LiV_2O_5$; or
(x) a Li—W—O compound such as $Li_2WO_4$.

Figure 2:
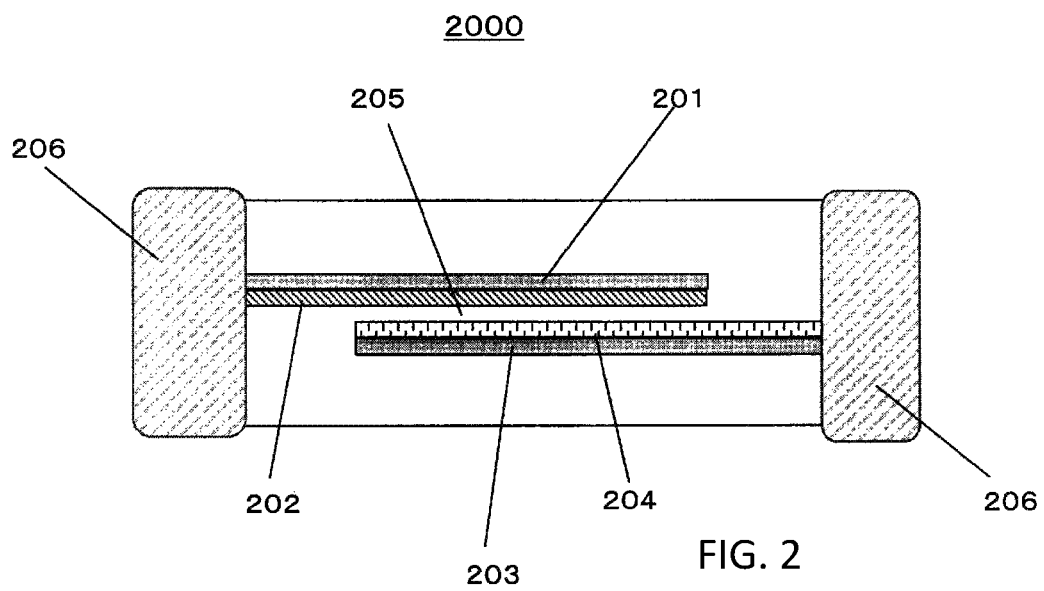
FIG. 2 shows a cross-sectional view of a battery according to a variation of the second embodiment.

FIG. 2 shows a cross-sectional view of the battery 2000 according to a variation of the second embodiment. As shown in FIG. 2, the battery 2000 comprises a first internal electrode 201, a first active material layer 202, a second internal electrode 203, a second active material layer 204, an electrolyte layer 205, and external electrodes 206. The first internal electrode 201 and the second internal electrode 203 correspond to the first electrode and the second electrode of the electricity storage device according to the second embodiment, respectively. The first internal electrode 201 and the second internal electrode 203 serve as current collectors.

The first active material layer 202 is provided on the first internal electrode 201. The second active material layer 204 is provided on the second internal electrode 203. The electrolyte layer 205 is provided between the first active material layer 202 and the second active material layer 204, both of which face each other. The first active material layer 202 and the second active material layer 204 may be a cathode active material layer and an anode active material layer, respectively.

The first active material layer 202 contains a cathode active material. The cathode active material contained in the first active material layer 202 is the same as the cathode active material set forth in the battery 1000. The second active material layer 204 contains an anode active material. The anode active material contained in the second active material layer 204 is the same as the anode active material set forth in the battery 1000.

The electrolyte layer 205 may contain the solid electrolyte according to the first embodiment.

Next, a fabrication method of the battery 2000 will be described in more detail.

First, the electrolyte layer 205 is produced. The electrolyte layer 205 may be produced by the fabrication method of the solid electrolyte described in the first embodiment. In other words, the weight of the calcined powder which is used as the starting material is measured. An organic binder (e.g., butyral resin), a solvent (e.g., butyl acetate), and a plasticizer (e.g., phthalate butyl benzyl (hereinafter, referred to as "BBP")) are added to the calcined powder to provide a mixture. These are dispersed in the mixture to provide slurry. The slurry is applied on films (e.g., polyethylene terephthalate films) by a doctor blade method to provide green seats. Then, a first active material paste is applied on one green sheet by a screen printing method to form the cathode active material layer. The first internal electrode is formed by a printing method on the cathode active material layer. In this way, a green sheet having the first internal electrode on the surface thereof is provided. Similarly, a second active material paste is applied on another green sheet by a screen printing method to form the anode active material layer. The second internal electrode is formed by a printing method on the anode active material layer. In this way, a green sheet having the second internal electrode on the surface thereof is provided.

The green sheet having the first internal electrode on the surface thereof is stacked on the green sheet having the second internal electrode on the surface thereof to provide a stacking structure. Next, the stacking structure is pressured. The pressured stacking structure is cut to separate it into a plurality of raw chips. The raw chips are heated at temperature, for example, of not less than 400 degrees Celsius and not more than 500 degrees Celsius in a nitrogen flow to remove the binder. In this way, chip elements are provided. Finally, the chip elements are sintered at temperature of not less than 1,050 degrees Celsius and not more than 1,150 degrees Celsius to provide elements each comprising the solid electrolyte according to first embodiment. Each of the elements provided in this way has a shape of a rectangular parallelepiped.

The external electrodes 206 are formed on a left side surface and a right side surface of the element having a shape of a rectangular parallelepiped to provide the battery 2000. The external electrodes 206 are formed, for example, as below. A paste containing electrical conductive particles containing glass frit within a range of not less than 0.5 percent by mass and not more than 10 percent by mass is applied on the left side surface and the right side surface of the element, and then, dried. Subsequently, the paste is heated at temperature of not less than 500 degrees Celsius and not more than 850 degrees Celsius to form the external electrodes 206. The glass frit has a softening temperature less than the temperature at which the paste is heated.

The external electrodes 206 may be formed with a solder on the left side surface and the right side surface. If the solder is used, the external electrodes 206 may be plated with a Ni—Sn alloy, which is generally used in the technical field of a chip component.

If each of the first internal electrode 201 and the second internal electrode 203 is formed of a metal which is not oxidized in an air, the paste applied to form the external electrodes 206 may be sintered in an air. An example of the metal which is not oxidized in an air is the Ag—Pd alloy.

If each of the first internal electrode 201 and the second internal electrode 203 is formed of a metal which is oxidized in an air, the paste applied to form the external electrodes 206 may be sintered in an inert atmosphere such as a nitrogen atmosphere. An example of the metal which is oxidized in an air is Ni or Cu.

Similarly to the battery 1000, since the battery 2000 includes the solid electrolyte according to the first embodiment, the battery 2000 has the excellent performance and the excellent stability. The battery 2000 may be produced not by the above-described sintering process but by a publicly known powder-compacting process.

If the electricity storage device according to the second embodiment is a multi-layer capacitor, the multi-layer capacitor comprises the first internal electrode 201, the second internal electrode 203, the electrolyte layer 205, and the external electrodes 206. The multi-layer capacitor does not comprise the first active material layer 202 and the second active material layer 204.

EXAMPLES

Hereinafter, the present disclosure will be described in more detail with reference to the following examples.

(Fabrication Method of Solid Electrolyte)

In the present examples, the solid electrolytes having the chemical compositions shown in Table 1A and Table 1B were fabricated by the following method.

First, a $Li_2CO_3$ powder, a $Pr_6O_{11}$ powder, and a $ZrO_2$ powder were prepared as the starting materials.

Subsequently, the weight of the starting materials was measured so as to have the chemical compositions shown in Table 1A and Table 1B.

Next, the powders were put into a ball mill formed of polyethylene.

Balls each formed of stabilized zirconia and pure water were added to the ball mill to provide a mixture. Each of the balls had a diameter of 5 millimeters.

The mixture was ground for approximately 20 hours.

The ground mixture had an average particle size of 0.67 micrometers.

The ground mixture was dehydrated, and then, dried to provide a powder.

The dried powder was put into a highly pure alumina crucible, and then, sealed with a lid.

The dried powder was calcined at approximately 750 degrees Celsius for two hours.

Subsequently, the calcined powder was put into the ball mill formed of polyethylene. Balls each formed of stabilized zirconia and pure water were added to the ball mill to provide a mixture. Each of the balls had a diameter of 5 millimeters.

The mixture was ground for approximately 20 hours. The ground mixture had an average particle size of 0.95 micrometers.

The ground mixture was dehydrated sufficiently, and then, dried to provide a powder.

Then, polyvinyl alcohol was added to the dried powder, and then, mixed to provide a mixture. The polyvinyl alcohol served as an organic binder.

The powder was dispersed in the mixture, and then, the mixture was classified through a filter having a square mesh having an interval of 0.50 millimeters to provide particles which had been passed through the filter.

Subsequently, the particles were dried to remove water which had been contained in the particles.

Then, the particles were pressured at pressure of $2t/cm^2$ with a die and a uni-axial oil-pressure press to provide a compact. The compact had a shape of a disk having a diameter of 13 millimeters and a thickness of 1.3 millimeters.

The compact was put into a thermally resistant container formed of alumina and sintered. Before the compact was put into the container, a zirconia powder was spread uniformly onto the bottom of the container to prevent the compact from being in direct contact with the bottom of the container. The zirconia powder had a mean particle size of 50 micrometers. Furthermore, a calcined powder having the same composition as that of the compact to be sintered was spread onto the zirconia powder, and then, the compact was put on the spread calcined powder.

The calcined powder is further supplied to the container, and then, the compact was surrounded by the calcined powder in such a manner that the compact was embedded in the calcined powder. Subsequently, the inside of the container was heated to 450 degrees Celsius to remove the organic binder (namely, polyvinyl alcohol).

Subsequently, a lid polished smoothly with sandpaper (800 grit) was put onto the container to seal the container, and then, the compact was sintered at the temperature and the period shown in Table 1A and Table 1B to provide a solid electrolyte.

A first electrode and a second electrode, each of which had a shape of a circle having a diameter of 6 millimeters (namely, approximately 28.26 square millimeters), were formed on the upper and lower surfaces of the solid electrolyte by an Au vapor deposition method to provide an electrical storage device according to the inventive example.

The mean particle size of the starting material is a value of a median size D50 thereof provided from a volume particle size distribution measured with a laser diffraction scattering-type particle diameter distribution measurement device. In particular, a sample powder is dispersed in 0.01 weight percent of a sodium hexametaphosphate aqueous solution with a homogenizer, and then, distribution of the particle size of the sample powder was measured with the laser diffraction scattering-type particle diameter distribution measurement device (product of MicrotracBEL corp., trade name: MT3100II). The value of D50 (namely, the particle diameter at 50% in the cumulative distribution) of the measured particle size distribution was deemed to be the mean particle size. The mean particle size of the calcined powder is also the value of D50 thereof.

(Evaluation of Solid Electrolyte)

As will be described below, the ion conductivity of the solid electrolyte was measured. Furthermore, the density of the solid electrolyte was calculated. The crystal phase of the solid electrolyte was identified.

(Ion Conductivity)

The ion conductivity of the solid electrolyte was calculated from the impedance property, the thickness, and the electrode area (i.e., approximately 28.26 square millimeters) of the solid electrolyte. The impedance property of the solid electrolyte was measured with an impedance measurement system (product of Solartron Metrology Ltd., trade name: 12608W) in a thermostat oven maintained at 25 degrees Celsius±1 degree Celsius within a range of measurement frequency from 10 Hz to 10 MHz.

(Density)

The density of the solid electrolyte was calculated by dividing the weight of the solid electrolyte by the volume provided on the basis of the outer shape of the solid electrolyte.

(Identification of Crystal Phase)

The crystal phase of the solid electrolyte was identified on the basis of both the analysis result of the crystal phase of the inside of the solid electrolyte and the analysis result of the crystal phase of the entire surface of the solid electrolyte.

The crystal phase of the inside of the solid electrolyte was identified as below.

First, the solid electrolyte was ground finely in a mortar.

The ground solid electrolyte was subjected to an X-ray diffraction analysis with an X-ray diffraction device using a CuKα (product of Rigaku Corporation) to provide an X-ray diffraction pattern at room temperature. The crystal phase of the solid electrolyte was identified on the basis of the analysis result of the X-ray diffraction pattern.

The crystal phase of the entire surface of the solid electrolyte was identified as below.

The X-ray diffraction pattern of the free surface (i.e., the surface which had not been processed after the sintering) was provided similarly to the case of the analysis of the crystal phase of the inside of the solid electrolyte. Then, the crystal phase of the entire surface of the solid electrolyte was identified on the basis of the analysis result of the X-ray diffraction pattern.

These results are shown in Table 1A and Table 1B. The sample number 15 is a missing number.

(Atmospheric Stability)

To evaluate atmospheric stability, changes of the solid electrolytes according to the sample numbers 2, 13, 19, and 23 were observed for 500 hours under room-temperature environment within a temperature range of 25 degrees Celsius±10 degrees Celsius (namely, not less than 15 degrees Celsius and not more than 35 degrees Celsius) and within a humidity range of not less than 50% and not more than 80%.

The observed changes were deterioration of the solid electrolyte and change ratio of the ion conductivity of the solid electrolyte.

To observe the deterioration, the solid electrolyte was left at rest at the room-temperature environment.

Water moisture and carbon dioxide contained in an air react with Li or rare earth elements contained in the solid electrolyte. As the reaction proceeds, a small crack is generated on the surface of the solid electrolyte at an initial stage, and finally, the solid electrolyte is broken into pieces. Note that the effect to the property of the solid electrolyte is hardly elicited at the initial stage.

The temporal change of the solid electrolyte was observed with a stereoscopic microscope (×10 fold). The time when the small crack was found was determined to be a deterioration time. The evaluation result is shown in Table 2.

(Change Ratio of Ion Conductivity)

The present inventors measured a change ratio of the ion conductivity of the solid electrolyte measured when 500 hours elapsed to the ion conductivity of the solid electrolyte measured when 0 hours elapsed (namely, to the ion conductivity measured when the solid electrolyte was provided), as the change ratio of the ion conductivity. The change ratio of the ion conductivity is shown in Table 2.

TABLE 1A

| Sample Number | Chemical Composition | Sintering Temperature (degrees Celsius) | Sintering period (hour) | Conductivity (S/cm) | Density of Sintered Body |
|---|---|---|---|---|---|
| 1 | $Li_{7(1+x)}Pr_3Zr_2O_{12+3.5x}$ (x = −0.05) | 1,150 | 10 | $3.5 \times 10^{-5}$ | 3.43 |
| 2 | $Li_{7(1+x)}Pr_3Zr_2O_{12+3.5x}$ (x = 0) | 1,100 | 2 | $2.2 \times 10^{-5}$ | 3.32 |
| 3 | $Li_{7(1+x)}Pr_3Zr_2O_{12+3.5x}$ (x = 0) | 1,100 | 5 | $7.5 \times 10^{-5}$ | 3.64 |
| 4 | $Li_{7(1+x)}Pr_3Zr_2O_{12+3.5x}$ (x = 0) | 1,100 | 10 | $2.8 \times 10^{-4}$ | 4.11 |
| 5 | $Li_{7(1+x)}Pr_3Zr_2O_{12+3.5x}$ (x = 0.02) | 1,100 | 10 | $4.7 \times 10^{-4}$ | 4.18 |

TABLE 1A-continued

| Sample Number | Chemical Composition | Sintering Temperature (degrees Celsius) | Sintering period (hour) | Conductivity (S/cm) | Density of Sintered Body |
|---|---|---|---|---|---|
| 6 | $Li_{7(1+x)}Pr_3Zr_2O_{12+3.5x}$ (x = 0.05) | 1,090 | 10 | $8.9 \times 10^{-5}$ | 3.98 |
| 7 | $Li_{7(1+x)}Pr_3Zr_2O_{12+3.5x}$ (x = 0.05) | 1,100 | 10 | $5.5 \times 10^{-4}$ | 4.31 |
| 8 | $Li_{7(1+x)}Pr_3Zr_2O_{12+3.5x}$ (x = 0.1) | 1,090 | 10 | $6.3 \times 10^{-4}$ | 4.42 |
| 9 | $Li_{7(1+x)}Pr_3Zr_2O_{12+3.5x}$ (x = 0.15) | 1,085 | 10 | $7.0 \times 10^{-4}$ | 4.49 |
| 10 | $Li_{7(1+x)}Pr_3Zr_2O_{12+3.5x}$ (x = 0.2) | 1,050 | 10 | $7.6 \times 10^{-5}$ | 3.71 |
| 11 | $Li_{7(1+x)}Pr_3Zr_2O_{12+3.5x}$ (x = 0.2) | 1,060 | 10 | $9.3 \times 10^{-5}$ | 3.99 |
| 12 | $Li_{7(1+x)}Pr_3Zr_2O_{12+3.5x}$ (x = 0.2) | 1,080 | 10 | $7.7 \times 10^{-4}$ | 4.49 |
| 13 | $Li_{7(1+x)}Pr_3Zr_2O_{12+3.5x}$ (x = 0.2) | 1,100 | 10 | $8.2 \times 10^{-4}$ | 4.5 |
| 14 | $Li_{7(1+x)}Pr_3Zr_2O_{12+3.5x}$ (x = 0.2) | 1,130 | 10 | $8.7 \times 10^{-5}$ | 4.5 |
| 16 | $Li_{7(1+x)}Pr_3Zr_2O_{12+3.5x}$ (x = 0.25) | 1,070 | 10 | $6.2 \times 10^{-4}$ | 4.51 |
| 17 | $Li_{7(1+x)}Pr_3Zr_2O_{12+3.5x}$ (x = 0.3) | 1,060 | 10 | $6.0 \times 10^{-4}$ | 4.52 |
| 18 | $Li_{7(1+x)}Pr_3Zr_2O_{12+3.5x}$ (x = 0.35) | 1,050 | 10 | $3.4 \times 10^{-5}$ | 4.54 |
| *19 | $Li_{7(1+x)}La_3Zr_2O_{12+3.5x}$ (x = 0) | 1,200 | 10 | $3.2 \times 10^{-5}$ | 3.97 |
| *20 | $Li_{7(1+x)}La_3Zr_2O_{12+3.5x}$ (x = 0) | 1,250 | 10 | $5.3 \times 10^{-4}$ | 4.42 |
| *21 | $Li_{7(1+x)}La_3Zr_2O_{12+3.5x}$ (x = 0.1) | 1,200 | 10 | $4.8 \times 10^{-5}$ | 3.87 |
| *22 | $Li_{7(1+x)}La_3Zr_2O_{12+3.5x}$ (x = 0.1) | 1,250 | 10 | $5.3 \times 10^{-5}$ | 4.02 |
| *23 | $Li_{7(1+x)}La_3Zr_2O_{12+3.5x}$ (x = 0.2) | 1,200 | 10 | $7.2 \times 10^{-5}$ | 3.75 |
| *24 | $Li_{7(1+x)}La_3Zr_2O_{12+3.5x}$ (x = 0.2) | 1,250 | 10 | $6.4 \times 10^{-5}$ | 3.81 |

TABLE 1B

| Sample Number | Crystal Phase (identified on the basis of the analysis results of the inside and the entire surface) |
|---|---|
| 1 | Pyrochlore (i.e., $Pr_2Zr_2O_7$), Tetragonal system garnet |
| 2 | Pyrochlore, Tetragonal system garnet |
| 3 | Pyrochlore, Tetragonal system garnet, Cubic system garnet |
| 4 | Cubic system garnet |
| 5 | Cubic system garnet |
| 6 | Tetragonal system garnet, Cubic system garnet |
| 7 | Cubic system garnet |
| 8 | Cubic system garnet |
| 9 | Cubic system garnet |
| 10 | Pyrochlore, Tetragonal system garnet, Cubic system garnet |
| 11 | Tetragonal system garnet, Cubic system garnet |
| 12 | Cubic system garnet |
| 13 | Cubic system garnet |
| 14 | Cubic system garnet, $Li_2ZrO_3$, $Li_{26}Pr_{36}O_{73}$ |
| 16 | Cubic system garnet |
| 17 | Cubic system garnet |
| 18 | Cubic system garnet, $Li_2ZrO_3$, $Li_{26}Pr_{36}O_{73}$ |
| *19 | Pyrochlore, Tetragonal system garnet, Cubic system garnet |
| *20 | Cubic system garnet |
| *21 | Cubic system garnet |
| *22 | Cubic system garnet |
| *23 | Cubic system garnet |
| *24 | Cubic system garnet, $Li_2ZrO_3$ |

TABLE 2

| Sample Number | Equivalent to | Presence or Absence of Deterioration | Deterioration Time | Conductivity (S/cm) at 500 hours | Change ratio of Conductivity/% |
|---|---|---|---|---|---|
| 25 | Sample Number 2 | Absent | >500 hours | $2.15 \times 10^{-4}$ | −2.27 |
| 26 | Sample Number 13 | Absent | >500 hours | $8.17 \times 10^{-4}$ | 0.3 |
| *27 | Sample Number 19 | Present | 20 hours | No data due to the deterioration | |
| *28 | Sample Number 23 | Present | >500 hours | $5.03 \times 10^{-4}$ | −30.1 |

Hereinafter, the solid electrolytes according to the sample numbers 1-24 will be described with reference to Table 1A and Table 1B. In Table 1A and Table 1B, the samples to which an asterisk (i.e., "*") has been added are excluded from the solid electrolyte according to the present disclosure. In other words, the asterisk means a comparative example.

Each of the solid electrolytes according to the sample numbers 1-24 has a crystal phase of a garnet-type crystal structure having a chemical composition $Li_{7(1+x)}\alpha_3Zr_2O_{12+3.5x}$. $\alpha$ is Pr or La. In other words, each of the solid electrolytes according to the sample numbers 1-24 has a chemical composition $Li_{7(1+x)}\alpha_3\beta_{2+a}O_{12+3.5x+b}$ ($\alpha$ is Pr or La, $\beta$ is Zr, a is equal to 0, and b is equal to 0).

As is clear from Table 1A and Table 1B, the compact containing Pr is sintered at lower temperature, compared to a compact having a conventional chemical composition of $Li_{7(1+x)}La_3Zr_2O_{12+3.5x}$ which does not contain Pr. In this way, a solid electrolyte containing Pr as a constituent element is provided. Each of the solid electrolytes provided in the sample numbers 3-24 is a dense sintered body having a cubic system garnet structure.

As is clear from comparison of the solid electrolytes according to the sample numbers 4, 8, and 12 to the solid electrolytes according to the sample numbers 19, 21, and 23, respectively, if the value of x in the chemical composition $Li_{7(1+x)}\alpha_3Zr_2O_{12+3.5x}$ is the same as the value of x in the chemical composition $Li_{7(1+x)}La_3Zr_2O_{12+3.5x}$, the solid electrolyte containing Pr as the constituent element has higher conductivity than the conventional solid electrolyte which does not contain Pr as the constituent element.

As is clear from comparison of the solid electrolytes according to the sample numbers 1-18 to each other, the sintering temperature is decreased from 1,150 degrees Celsius to 1,050 degrees Celsius with an increase in the Li content contained in the compact containing Pr as the constituent element (namely, with an increase in the value of x from −0.05 to 0.35). Furthermore, the density and the electrical conductivity of the solid electrolyte are raised with an increase in the Li content contained in the solid electrolyte containing Pr as the constituent element (namely, with an increase in the value of x from −0.05 to 0.35). It is desirable that the value of x is not less than 0 and not more than 0.35 from the viewpoints of the sintering temperature, the density of the solid electrolyte, and the electrical conductivity of the solid electrolyte.

On the other hand, as is clear from comparison of the solid electrolytes according to the sample numbers 19-24 to each other, the sintering temperature is required to be not less than 1,200 degrees Celsius, regardless of the increase in the Li content contained in the compact which does not contain Pr (namely, regardless of the increase in the value of x from 0 to 0.2). Furthermore, the density and the electrical conductivity of the solid electrolyte are lowered together with the increase in the Li content contained in the solid electrolyte which does not contain Pr (namely, with the increase in the value of x from 0 to 0.2).

From these results, the present inventors found the mechanism during the sintering, the crystal phase of the solid electrolyte, and the composition dependency of the electrical conductivity are different between the solid electrolyte which contains Pr as the constituent element and the prior solid electrolyte which contains La as the constituent element.

In the solid electrolyte according to the sample number 2, the crystal structure of the cubic system garnet-type crystal structure was not observed. However, in the solid electrolytes according to the sample numbers 3 and 4, both of which had the same chemical composition as that of the sample number 2, the sintering period was extended. As a result, the cubic system garnet-type crystal structure was generated at the same sintering temperature. In other words, in the solid electrolyte according to the sample number 2, the cubic system garnet-type crystal structure was not observed. On the other hand, in the solid electrolytes according to the sample numbers 3 and 4, the cubic system garnet-type crystal structure was observed. Note that the compacts each having the identical chemical composition to each other (namely, $Li_{7(1+x)}Pr_3Zr_2O_{12+3.5x}$, where x=0) were sintered at the identical temperature to each other (namely, 1,100 degrees Celsius); however, that the sintering periods were different from each other in the sample numbers 2-4.

Hereinafter, atmospheric stability of the solid electrolyte will be described with reference to Table 2. In Table 2, the samples to which an asterisk (i.e., "*") has been added are excluded from the solid electrolyte according to the present disclosure. In other words, the asterisk means a comparative example.

The solid electrolytes according to the sample numbers 25 and 26 will be compared to the solid electrolytes according to the sample numbers 27 and 28. The solid electrolytes according to the sample numbers 25, 26, 27 and 28 are the same as the solid electrolytes according to the sample numbers 2, 13, 19, and 23, respectively.

Each of the solid electrolytes according to the sample numbers 25 and 26 has a chemical composition of $Li_{7(1+x)}\alpha_3Zr_2O_{12+3.5x}$ (where $\alpha$ is Pr). In other words, each of the solid electrolytes according to the sample numbers 25 and 26 is a solid electrolyte having a Pr garnet-type crystal structure. Each of the solid electrolytes according to the sample numbers 27 and 28 has a chemical composition of $Li_{7(1+x)}\alpha_3Zr_2O_{12+3.5x}$ (where $\alpha$ is La). In other words, each of the solid electrolytes according to the sample numbers 25 and 26 is a solid electrolyte having a La garnet-type crystal structure.

It is known that an unnecessary phase composed of a trace amount of the pyrochlore structure is easily generated in a sintered body having a La garnet-type crystal structure.

Each of the solid electrolytes according to the sample number 25 (i.e., the inventive example) and the sample number 27 (i.e., the comparative example) contain a pyrochlore phase. However, as is clear from the comparison of the solid electrolyte according to the sample number 25 to the solid electrolyte according to the sample number 27, the solid electrolyte having the Pr garnet-type crystal structure has more excellent atmospheric stability than the solid electrolyte having the La garnet-type crystal structure.

Each of the solid electrolytes according to the sample number 26 (i.e., the inventive example) and the sample number 28 (i.e., the comparative example) was determined to be composed of a single phase in the X-ray diffraction pattern. The electrical conductivity of the solid electrolyte according to the sample number 26 is substantially constant, whereas the conductivity of the solid electrolyte according to the sample number 28 decreases significantly with the temporal change. As just described, the solid electrolyte according to the sample number 26 has more excellent atmospheric stability than the solid electrolyte according to the sample number 28. Note that the solid electrolytes according to the sample number 26 (i.e., the inventive example) and the sample number 28 (i.e., the comparative example) may contain a trace amount of a pyrochlore phase which is not detected in an X-ray diffraction.

Hereinafter, the reason for the difference of the property between the solid electrolytes where α is Pr and where α is La will be described in detail together with the function effect thereof.

As described above, since Li contained in the Li-based material is easily evaporated during the sintering, after the Li-based material is sintered at high sintering temperature, a crystal phase of Li defects (e.g., a pyrochlore phase ($La_2Zr_2O_7$)) tends to be segregated at a grain boundary region. Even in trace amount, the segregated crystal phase of the Li defects is decomposed due to the reaction with at least one selected from the group consisting of water moisture and carbon dioxide contained in an air. As a result, a problem that the crystal phase is swelled occurs. Due to the swelling, cracks are generated between crystal particles each having a garnet-type crystal structure, and finally, the sintered body is deteriorated.

On the other hand, the compacts according to the inventive examples containing Pr as the constituent element were sintered at temperature lower than the temperature at which the compacts containing La were sintered. As a result, the composition contained in the compact was prevented from being evaporated during the sintering of the compact to improve atmospheric stability.

As just described, in the solid electrolytes according to the inventive examples containing Pr as the constituent element, since the composition contained in the compact was prevented from being evaporated during the sintering, the atmospheric stability is improved. As shown in Table 2, the solid electrolytes according to the sample numbers 25 and 26 were not deteriorated, even after left at rest for 500 hours at temperature of 25 degrees Celsius±10 degrees Celsius at humidity of not less than 50% and not more than 80%. On the other hand, the solid electrolyte according to the sample number 27 was deteriorated in 20 hours. In the solid electrolyte according to the sample number 28, the electrical conductivity was decreased significantly after 500 hours elapsed.

As described above, it was found that the solid electrolyte containing Pr has significantly higher atmospheric stability than the solid electrolyte which does not contain Pr.

Furthermore, as found in the solid electrolyte according to the sample number 25, even if the Pr—Zr pyrochlore phase in a trace amount is present in the solid electrolyte between the crystal phases each having Pr garnet-type crystal structure (i.e., between $Li_7Pr_3Zr_2O_{12}$), the solid electrolyte has the high stability.

As described above, the sintering and the change of the crystal phase are likely to proceed at lower temperature in a case where the Li content is excessive (i.e., if x>0) than in a case where x=0. As a result, the cubic-system garnet-type crystal structure is formed stably, and the electrical conductivity is raised. For example, in the sample number 12 (x=0.2), the solid electrolyte composed of the single phase of the cubic-system garnet-type crystal structure at sintering temperature of 1,080 degrees Celsius is provided. The solid electrolyte has high density of 4.49 g/cm$^3$ and good electrical conductivity of $7.7\times10^{-4}$ S/cm.

The solid electrolyte according to the sample number 18 (α=Pr and x=0.35) has an electrical conductivity of $3.4\times10^{-5}$ S/cm. On the other hand, the solid electrolyte according to the sample number 17 (α=Pr and x=0.3) has an electric conductivity of $6.0\times10^{-4}$ S/cm. The solid electrolyte according to the sample number 17 has higher electrical conductivity than the solid electrolyte according to the sample number 18. Therefore, the electrical conductivity when x is not more than 0.3 is higher than the electrical conductivity when x is over 0.3.

As described above, if the Li amount is large, the problem of the fusion of the solid electrolyte due to the excessive sintering may occur. If the value of x is not more than 0.3, the problem of the fusion is prevented more certainly from occurring, compared to the case where the value of x is more than 0.3.

As described above, the value of x is not less than −0.05 and not more than 0.35. It is desirable that the value of x is not less than 0 and not more than 0.35 from the three viewpoints of the decrease of the sintering temperature, the improvement of the electrical conductivity, and the prevention of the problem of the fusion due to the excessive sintering. More desirably, the value of x is not less than 0 and not more than 0.3.

In the solid electrolyte according to the sample number 14, the crystal structures of the cubic system garnet-type crystal structure, $Li_2ZrO_3$, and $Li_{26}Pr_{36}O_{73}$ were detected in the powdery X-ray diffraction. It is conceivable that the detection result means that a part of the crystal phase having the cubic-system garnet-type crystal structure has been decomposed on the front surface of the solid electrolyte. The solid electrolyte according to the sample number 14 has lower electrical conductivity than the solid electrolytes according to the sample numbers 12 and 13. Note that the solid electrolytes according to the sample numbers 12-14 have the same chemical composition as each other. The present inventors believe that this is because the amount of Li is large (namely, x=0.2) and because the compact was sintered at relatively high temperature of 1,130 degrees Celsius.

INDUSTRIAL APPLICABILITY

The solid electrolyte according to the present disclosure can be used for a secondary battery of an electrical device or a car. The electricity storage device according to the present disclosure can be used as a secondary battery of an electrical device or a car.

REFERENTIAL SIGNS LIST

1000 Battery
101 Cathode
102 Electrolyte layer
103 Anode
104 Cathode active material particle
105 Anode active material particle
2000 Battery
201 First internal electrode
202 First active material layer
203 Second internal electrode
204 Second active material layer
205 Electrolyte layer
206 External electrode

The invention claimed is:
1. A solid electrolyte, containing:
a crystal phase having a chemical composition $Li_{7(1+x)}\alpha_3\beta_{2+a}O_{12+3.5x+b}$
where:
α includes Pr;
β includes Zr;
0.15≤x≤0.35;
−0.5≤a≤0.5; and
−0.5≤b≤0.5.

2. The solid electrolyte according to claim 1, wherein the following mathematical formula is satisfied:

$0.15 \leq x \leq 0.3$.

3. The solid electrolyte according to claim 1, wherein a molar ratio of Pr to the entire of α is not less than 0.8; and a molar ratio of Zr to the entire of β is not less than 0.8.

4. The solid electrolyte according to claim 1, wherein α is Pr; and

β is Zr.

5. The solid electrolyte according to claim 1, wherein the two following mathematical formulas are satisfied:
a=0; and
b=0.

6. The solid electrolyte according to claim 1, wherein the crystal phase has a cubic-system garnet-type crystal structure.

7. The solid electrolyte according to claim 1, wherein the solid electrolyte has a density of not less than 4.0 gram/cm$^3$.

8. An electricity storage device, comprising:
a first electrode;
a second electrode; and
a solid electrolyte according to claim 1.

9. The electricity storage device according to claim 8, wherein
each of the first electrode and the second electrode includes a metal having a melting point of not more than 1100 degrees Celsius.

10. The electricity storage device according to claim 9, wherein
the metal is an Ag—Pd alloy.

11. The electricity storage device according to claim 8, wherein
each of the first electrode and the second electrode is composed of an Ag—Pd alloy; and
a molar ratio of Ag to Pd in the Ag—Pd alloy is more than 6/4.

12. The electricity storage device according to claim 8, wherein
the electricity storage device is a battery or a multi-layer capacitor.

13. The electricity storage device according to claim 12, wherein
the electricity storage device is a battery;
the battery comprises an electrolyte layer provided between the first electrode and the second electrode; and
at least one selected from the group consisting of the first electrode, the second electrode, and the electrolyte layer includes the solid electrolyte.

14. The electricity storage device according to claim 13, wherein
the electrolyte layer includes the solid electrolyte.

15. An electricity storage device, comprising:
a first electrode;
a second electrode; and
a solid electrolyte, wherein:
the solid electrolyte, containing a crystal phase having a chemical composition $Li_{7(1+x)}\alpha_3\beta_{2+a}O_{12+3.5x+b}$, where:
α includes Pr;
β includes Zr;
$-0.05 \leq x \leq 0.35$;
$-0.5 \leq a \leq 0.5$; and
$-0.5 \leq b \leq 0.5$,
each of the first electrode and the second electrode is composed of an Ag—Pd alloy, and
a molar ratio of Ag to Pd in the Ag—Pd alloy is more than 6/4 and not more than 7/3.

* * * * *